*Louth & Howe,*

*Seed Dropper.*

No. 97,938. Patented Dec. 14, 1869.

Witnesses: Inventor:

UNITED STATES PATENT OFFICE.

M. F. LOWTH AND T. J. HOWE, OF OWATONNA, MINNESOTA.

IMPROVEMENT IN SEEDING-MACHINES.

Specification forming part of Letters Patent No. 97,938, dated December 14, 1869.

*To all whom it may concern:*

Be it known that we, M. F. LOWTH and T. J. HOWE, of Owatonna, in the county of Steele and State of Minnesota, have invented a new and Improved Seeding-Machine; and we do hereby declare that the following is a full, clear, and exact description of the construction and operation of the same, reference being had to the accompanying drawings, making a part of this specification, in which—

Figure 1:
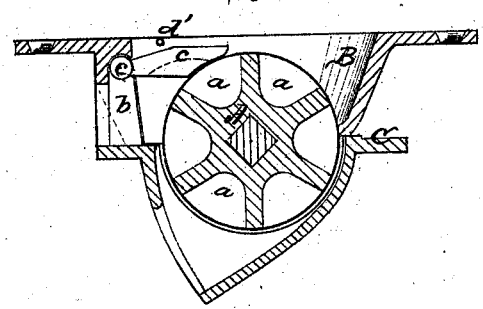
Figure 2:
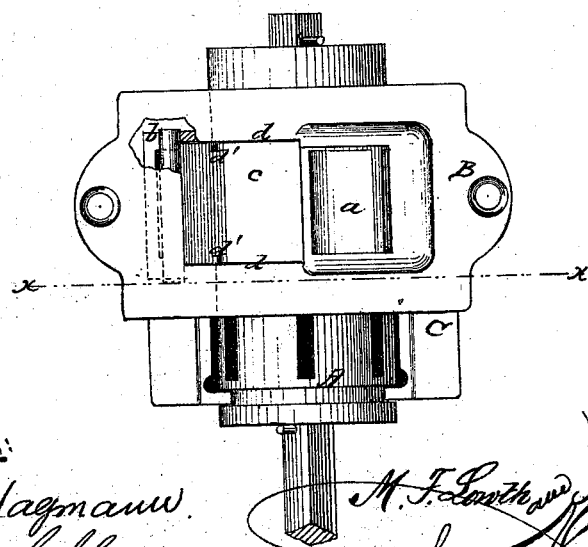

Figure 1 is a transverse vertical section, and Fig. 2 is a plan view.

This invention relates to that class of seeders which employ a revolving cylinder having pockets in its periphery, and placed at the bottom of the hopper which contains the seed, the function of the pockets being to receive seed when right side up and drop it when inverted.

The invention consists in the provision of a gate pivoted, at its rear end, in the side of the hopper in any convenient manner, and lying upon the revolving cylinder just below the top of the hopper, its front edge coming about midway of the latter lengthwise, the hopper being recessed at those parts of its sides where the gate lies, in order to allow the latter free play up and down, subject to the control of stops placed in said recessed portions for the purpose of limiting the rise of the gate, the latter being made thus vertically movable for the purpose of allowing seed that may chance to become jammed between the tops of the radial flanges that separate the pockets and the gate to pass under the latter without being crushed.

In the drawings, A is the seed-cylinder, and $a\ a$ the pockets. B is the hopper, resting, in this instance, upon the flanges projecting horizontally from the upper edges of the box C, in which the cylinder revolves. From one of said flanges projects upward an inch, or such a matter, a standard, $b$, outside of which are the legs of the hopper, and on the top of which, at its ends, are grooves, in which rest the trunnions of the gate $c$. The hopper shuts down over the gate $c$ and holds its trunnions in place. The gate lies on the revolving cylinder A, below the top of the hopper, and in recesses $d\ d$, made in the sides of the latter to a depth sufficient to admit of the free play of the gate vertically upon its trunnions, subject to the action of stops $d'\ d'$, projecting from the recessed sides of the hopper at such points as enable the gate to rise sufficiently. The necessity for the vertical play of the free edge of the gate $c$ arises from the fact that, while it is expedient to shut off the grains in the hopper from those in the pocket that has passed to one side of the perpendicular, yet it sometimes happens that kernels become jammed between the edge of the cut-off device and the tops of the radial flanges separating the pockets. When such jamming takes place in our machine, the yieldingness of the gate $c$ prevents crushing of the seeds, as the edge of the gate lifts and the caught grains pass under it without injury.

Having thus described our invention, what we claim as new, and desire to secure by Letters Patent, is—

A gate placed in such relation to the hopper and cylinder of a seeding-machine as to yield sufficiently to allow caught kernels to pass under it without injury, substantially as described.

M. F. LOWTH.
T. J. HOWE.

Witnesses:
LEWIS L. WHEELOCK,
JAMES COOPER.